United States Patent
Smith et al.

(10) Patent No.: US 10,735,389 B2
(45) Date of Patent: Aug. 4, 2020

(54) SYSTEMS, DEVICES, AND METHODS FOR PREVENTING UNAUTHORIZED ACCESS TO STORAGE DEVICES

(71) Applicant: Samsung Electronics Co., Ltd., Suwon-si, Gyeonggi-do (KR)

(72) Inventors: Hubbert Smith, San Jose, CA (US); Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 148 days.

(21) Appl. No.: 15/953,364

(22) Filed: Apr. 13, 2018

(65) Prior Publication Data

US 2018/0241729 A1   Aug. 23, 2018

Related U.S. Application Data

(62) Division of application No. 15/297,125, filed on Oct. 18, 2016, now Pat. No. 10,003,585.

(60) Provisional application No. 62/370,234, filed on Aug. 2, 2016.

(51) Int. Cl.
*H04L 29/06* (2006.01)
*G06F 21/62* (2013.01)
*G06F 21/57* (2013.01)
*G06F 21/60* (2013.01)
*H04L 9/08* (2006.01)

(52) U.S. Cl.
CPC .............. *H04L 63/06* (2013.01); *G06F 21/57* (2013.01); *G06F 21/60* (2013.01); *G06F 21/602* (2013.01); *G06F 21/62* (2013.01); *G06F 21/6218* (2013.01); *H04L 9/088* (2013.01); *H04L 9/0894* (2013.01); *H04L 63/062* (2013.01); *H04L 63/08* (2013.01); *H04L 63/10* (2013.01); *H04L 2463/062* (2013.01)

(58) Field of Classification Search
CPC ....... H04L 63/06; H04L 63/062; H04L 63/10; H04L 63/08; H04L 9/0894; H04L 9/088; H04L 2463/062; G06F 21/57; G06F 21/6218; G06F 21/62; G06F 21/602; G06F 21/60
See application file for complete search history.

(56) References Cited

U.S. PATENT DOCUMENTS

| | | | |
|---|---|---|---|
| 8,539,557 B1 | 9/2013 | Buckner et al. | |
| 8,566,578 B1 | 10/2013 | Banerjee | |
| 9,100,188 B2 | 8/2015 | Spiers et al. | |
| 9,270,459 B2 | 2/2016 | Mukkara et al. | |
| 9,357,331 B2 | 5/2016 | Huang | |
| 2007/0168678 A1 | 7/2007 | Meenakshisundaram | |
| 2008/0104368 A1 | 5/2008 | Hasegawa | |
| 2010/0031063 A1* | 2/2010 | Fascenda ............ | G06F 11/1458 713/193 |

(Continued)

*Primary Examiner* — Meng Li
(74) *Attorney, Agent, or Firm* — Renaissance IP Law Group LLP

(57) ABSTRACT

Embodiments include a storage device, comprising: a communication interface; data storage media; key storage media; and control logic configured to: receive a first key associated with a second key through the communication interface; store the first key in the key storage media; and restrict access through the communication interface to data stored in the data storage media using at least one of the first key and the second key.

12 Claims, 9 Drawing Sheets

(56) References Cited

U.S. PATENT DOCUMENTS

| | | |
|---|---|---|
| 2011/0314304 A1 | 12/2011 | Braams |
| 2013/0266137 A1 | 10/2013 | Blankenbeckler et al. |
| 2014/0236892 A1* | 8/2014 | Blyler .................. G06F 11/1451 707/625 |
| 2014/0331337 A1 | 11/2014 | Factor et al. |
| 2015/0019858 A1 | 1/2015 | Roth et al. |
| 2015/0310188 A1* | 10/2015 | Ford ........................ G06F 21/10 726/28 |
| 2016/0335451 A1* | 11/2016 | Sinor .................... H04L 63/045 |
| 2017/0171019 A1* | 6/2017 | Nayak .................. G06F 16/122 |

* cited by examiner

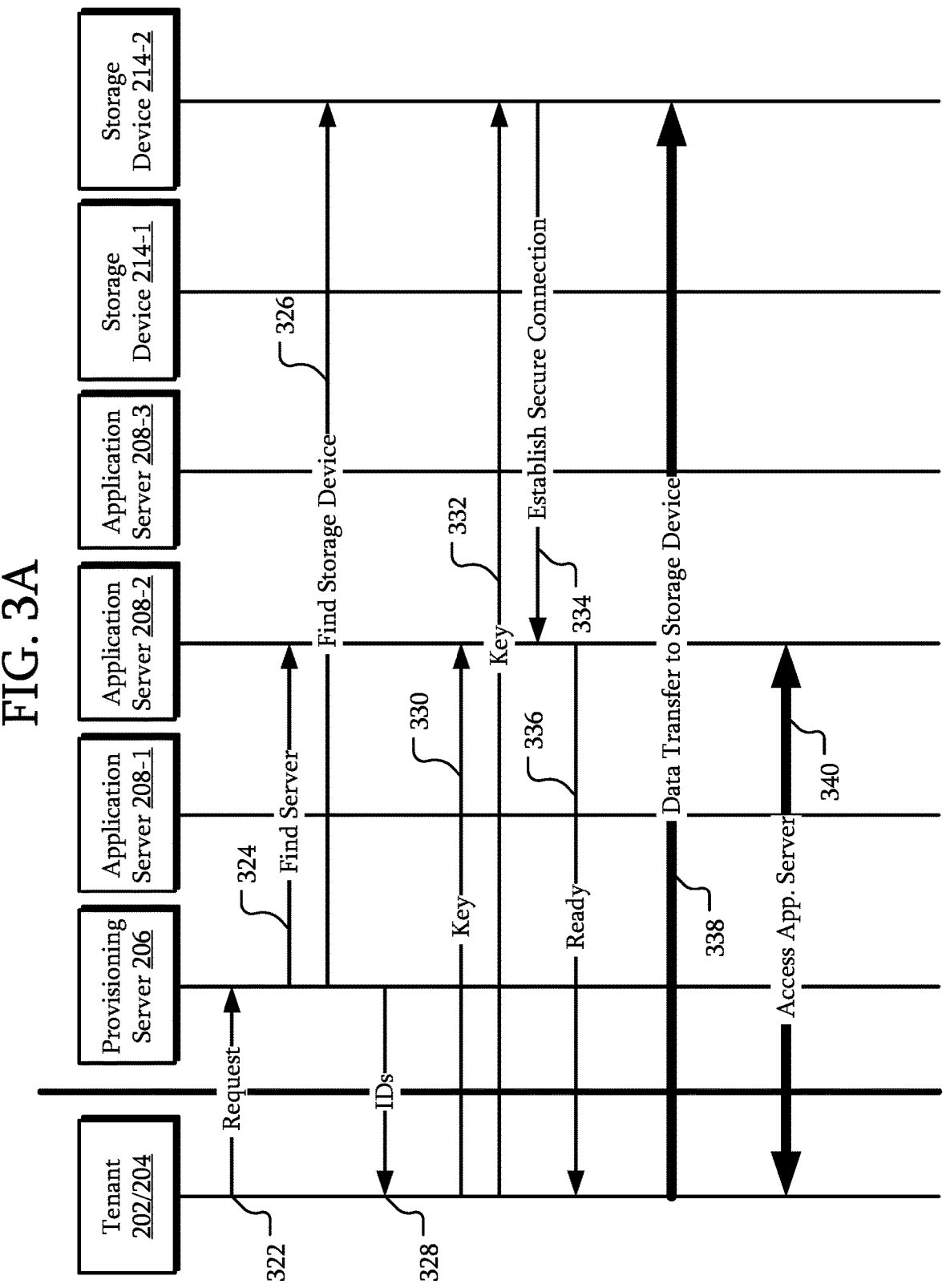

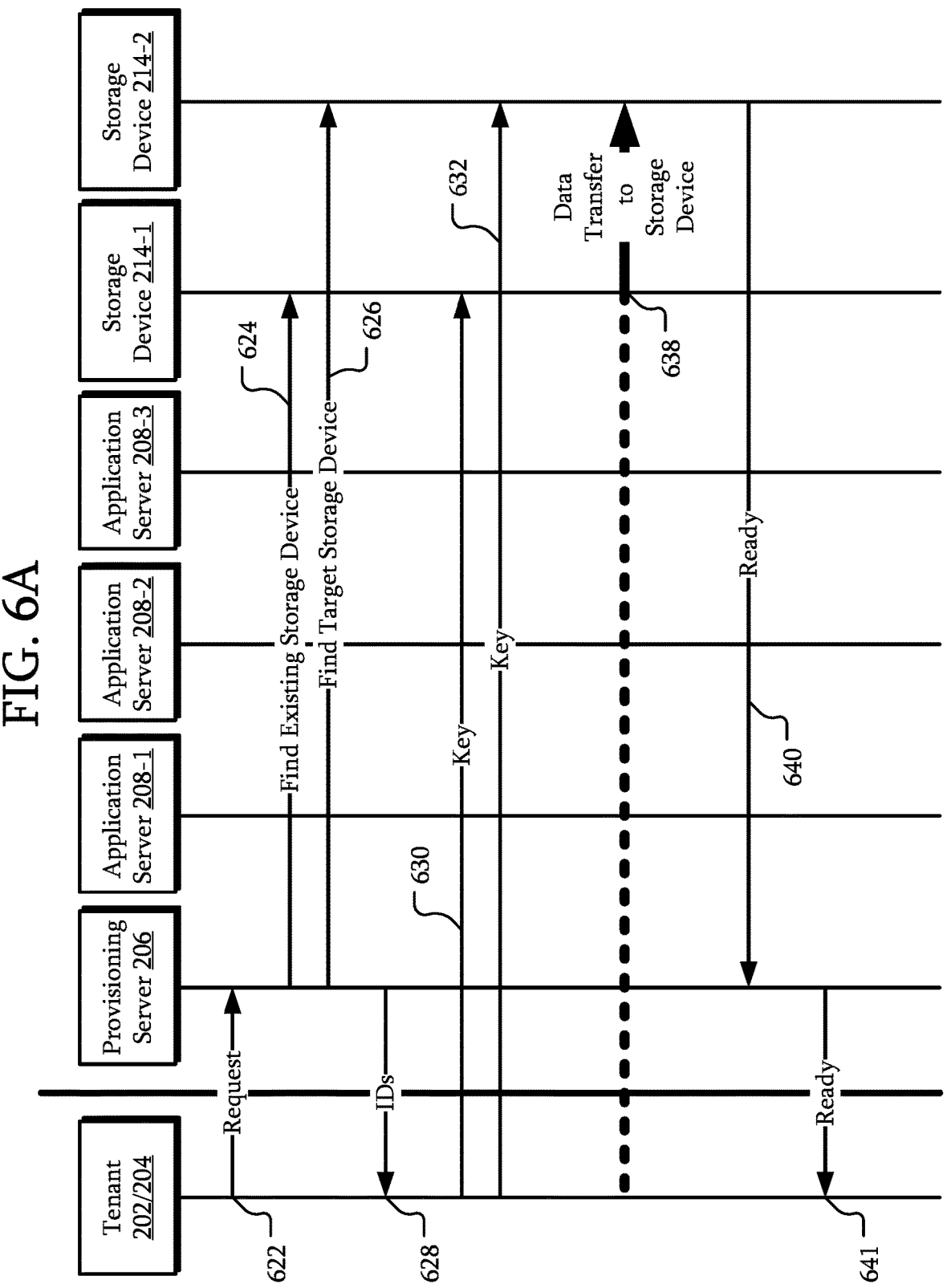

SYSTEMS, DEVICES, AND METHODS FOR PREVENTING UNAUTHORIZED ACCESS TO STORAGE DEVICES

CROSS-REFERENCE TO RELATED APPLICATIONS

This U.S. non-provisional patent application is a divisional of U.S. patent application Ser. No. 15/297,125, filed on Oct. 18, 2016, which claims the benefit of U.S. Provisional Patent Application No. 62/370,234, filed Aug. 2, 2016, the contents of which is hereby incorporated by reference herein, in its entirety, for all purposes.

BACKGROUND

This disclosure relates systems, devices, and methods for preventing unauthorized access to storage devices.

Cloud-based systems may be used to store data remotely. Various security techniques have been developed to prevent unauthorized access of the data. While these techniques may protect the data from third-party access, the techniques may allow root-level access to the data by the service provider. Thus, an administrator for the cloud-based service provider or a third party that obtains root-level privileges and access to the service providers systems may have access to the data because of the root-level privileges.

SUMMARY

Embodiments include a storage device, comprising: a communication interface; data storage media; key storage media configured to store a first key associated with a second key; and control logic configured to restrict access to data stored in the data storage media using at least one of the first key and the second key.

Embodiments include a system, comprising: a storage device storing a first key associated with a second key; and application server configured to access the storage device; wherein the application server is configured to encrypt data received from a tenant system using the second key and store the encrypted data in the storage device.

Embodiments include a method, comprising: receiving, at a storage device, a first key associated with a second key; storing the first key in a first storage media of the storage device; and restricting access to data stored in a second storage media of the storage device using at least one of the first key and the second key.

BRIEF DESCRIPTION OF SEVERAL VIEWS OF THE DRAWINGS

FIGS. 3A and 3B illustrate operations of systems according to some embodiments.

FIGS. 6A and 6B illustrate operations of systems according to some other embodiments.

DETAILED DESCRIPTION

Figure 1:
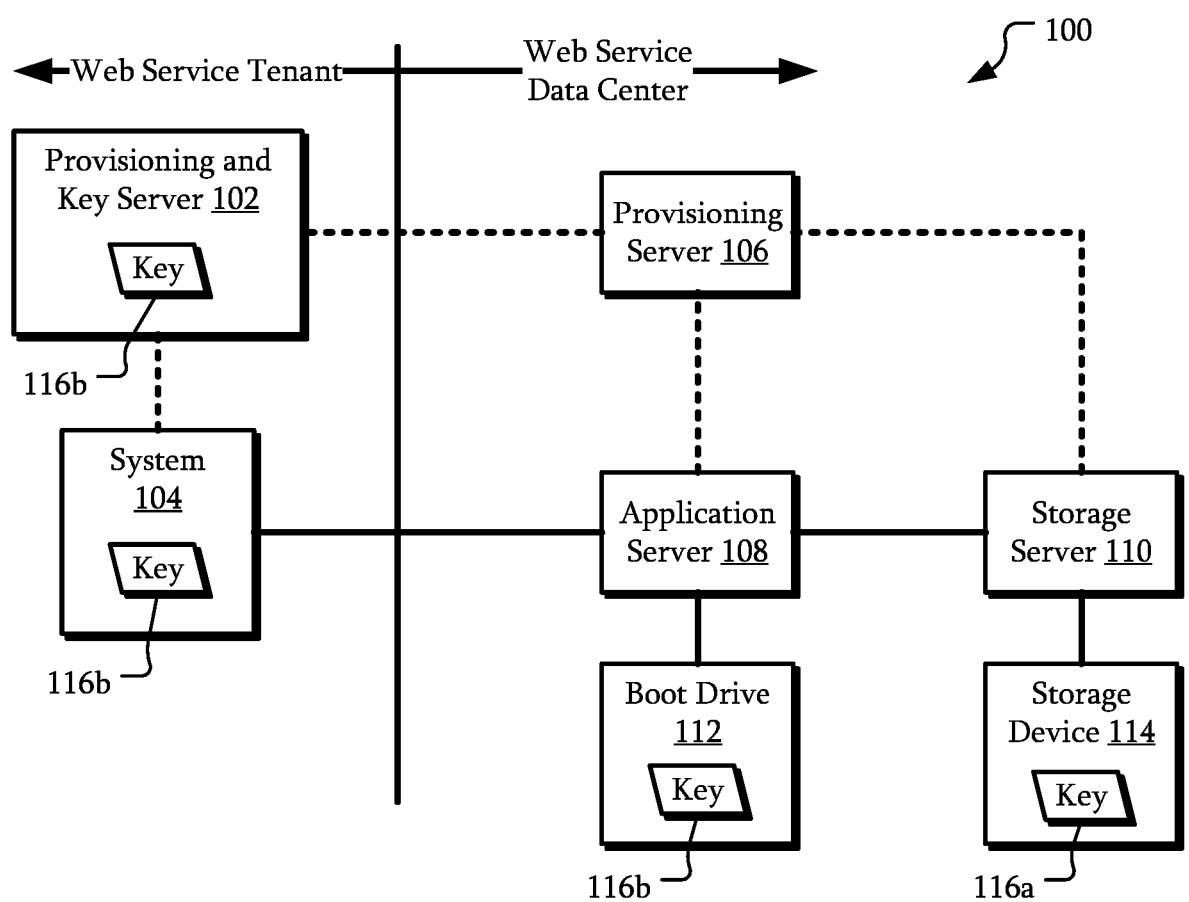
FIGS. 1-2 are schematic views of systems according to various embodiments.

The embodiments relate to systems, devices, and methods for preventing unauthorized access to storage devices. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods, devices, and systems provided in particular implementations.

However, the methods, devices, and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain operations. However, the method and system may operate according to other methods having different and/or additional operations and operations in different orders and/or in parallel that are not inconsistent with the embodiments. Thus, embodiments are not intended to be limited to the particular embodiments shown, but are to be accorded the widest scope consistent with the principles and features described herein.

The embodiments are described in the context of particular systems or devices having certain components. One of ordinary skill in the art will readily recognize that embodiments are consistent with systems or devices having other and/or additional components and/or other features. Methods, device, and systems may also be described in the context of single elements. However, one of ordinary skill in the art will readily recognize that the methods and systems are consistent with the use of architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIGS. 1-4 are schematic views of systems according to various embodiments. Referring to FIG. 1, in some embodiments a system 100 includes a web service data center. For example, a web service data center may include hardware, whether shared or dedicated, that may be provisioned for a tenant for application services and/or storage. The system 100 includes a provisioning server 106, an application server 108, and a storage server 110.

The provisioning server 106 is a server configured to manage provisioning of resources for the system 100. The provisioning server 106 is coupled to the application server 108 and the storage server 110 through communication links illustrated by the dashed lines. These dashed lines represent control plane communications in contrast to the solid lines that represent data plane communications. As will be described in further detail below, in some embodiments, the provisioning server 106 is configured to allocate storage to a tenant and prompts the tenant to produce keys.

The application server 108 is a server configured to provide a web service to a tenant. For example, the application server 108 may be configured to provide a storage service, provide a database service, provide a web hosting service, or the like. The application server 108 is coupled to a boot drive 112. The boot drive 112 is a storage device used to boot the application server 108.

The storage server 110 is a server configured to provide access to a storage device 114. The storage server 110 is coupled to at least one storage device 114. Although only one storage device 114 is illustrated, in other embodiments, multiple storage devices 114 may be coupled to the storage server 110. The storage device 114 is a device configured to store data. The storage device 114 may include a solid state drive (SSD), a hard disk drive (HDD), or the like.

A web service tenant is configured to access a service provided by the web service data center. The web service tenant may be divided from the web service data center by a firewall, a network, the Internet, and/or the like. In particular, the web service tenant includes a provisioning and key server 102 and at least one system 104. The provisioning and key server 102 is a server configured to handle provisioning on the tenant side of the web service data center. The provisioning and key server 102 is coupled to the system 104 and the provisioning server 106 of the web service data center.

In some embodiments, the tenant system 104 is a system of a person or business entity storing non-public data in "the cloud" with a web service provider. For example, the tenant system 104 may be an application server running enterprise application software, such as a database, email server, sharing/collaboration application, object/records software, or the like. Here, the tenant system 104 is configured to store data on the storage presented through the application server 108. That is, the tenant system 104 may be a client for a storage service provided by the web service data center. The tenant system 104 implementing an application server may be controlled by the tenant and may be located at a tenant site. That is, the tenant system 104 may not be hosted. In other embodiments, the tenant system 104 is a client using a hosted application on the application server 108 different from a storage service. For example, the application server 108 may run various enterprise applications as described above. Regardless, data storage for such applications is provided by the web service data center and, in particular, the storage device 114.

The storage device 114 is configured to store a key 116a. The boot drive 112 and the tenant system 104 are configured to store a second key 116b that is associated with the first key 116a. For example, the keys 116a and 116b may be asymmetric private and public keys of a key pair. In other embodiments, the keys 116a and 116b may be symmetric keys. As will be described in further detail below, the keys 116a and 116b are created by the tenant.

In some embodiments, in operation, the tenant system 104 and/or the application server 108 is configured to encrypt data using the key 116b. The encrypted data is then transmitted to and stored in the storage device 114. When data is read from the storage device 114, the storage device 114 may be configured to read the data using the key 116a.

In some embodiments, the keys 116a and 116b are not used for encryption, but are used for authorization. The storage device 114 may include a register that is involved in regulating access to all or a portion of the storage media of the storage device 114. The keys 116a and 116b are used to authenticate an access so that a register may be configured to allow access to the associated data.

Although a single key pair of keys 116a and 116b has been used as an example, in some embodiments, keys from multiple key pairs may be stored in a single storage device 114. Each key may be associated with a different portion of the data stored in the storage device 114. Accordingly, different keys may be used to decrypt and/or authorize access to different portions of data stored in the storage device 114.

In some embodiments, the operations described herein improve the security between the application tier and the network-attached storage tier. In particular, web tenants are able to securely access data they own. However, web services providers are prevented from accessing data owned by web tenants and secured as described herein. In particular, even with root privileges, the services provider is disallowed from tenant data access because of the encryption and the lack of access to a key to decrypt the data or by a lack of a key for authorization. As a result, in some embodiments, a web tenant may more completely secure data against access by anyone other than the web tenant owner using a key-pair system as described herein. Moreover, the security may be improved by not relying on intervening operating systems. That is, the security is implemented using the storage device 114 itself, without relying on security or privileges of an operating system of the web service data center. Such an operating system may be compromised by a user with root-level access. By moving the endpoint of the security to the storage device 114 itself, access granted by root-level privileges at intervening servers will not allow access to the clear data stored in the storage device 114.

In addition, multi-tenancy is adopted by cloud service providers to reduce the costs of the infrastructure and improve the efficiency of servers and storage equipment. However, a barrier to cloud adoption is the lack of security of corporate data from access by managed hosting providers for the multitenancy. Improving the security may allow additional applications to take advantage of cloud-based storage. In particular, by securing data from root-level accesses to the storage device 114, applications that are sensitive to security risks may be more readily moved to cloud-based storage. For example, test and development applications and tier 2 applications such as email and sharepoint applications may be operated using cloud storage. However, other applications, such as tier 1 IT applications may not use cloud-based storage due to data security risk. As described herein, security of the data may be increased, leading to greater adoption of cloud-based storage by such applications.

In some embodiments, the storage device 114 is pre-configured/programmed at factory. For example, if a storage device 114 is sold for enterprise customers then storage device 114 may be preconfigured with a default key or a key provided by the customer. This key may be stored as the key 116a and used as described herein.

In a particular embodiment, after the initial bootup of the storage device 114, the storage device 114 will prompt a dialog for the tenant to enter the keys 116a and/or 116b. The tenant may then use the storage device 114 to securely store data. Alternatively, the tenant may reconfigure the storage device 114 as will be described below.

Figure 2:
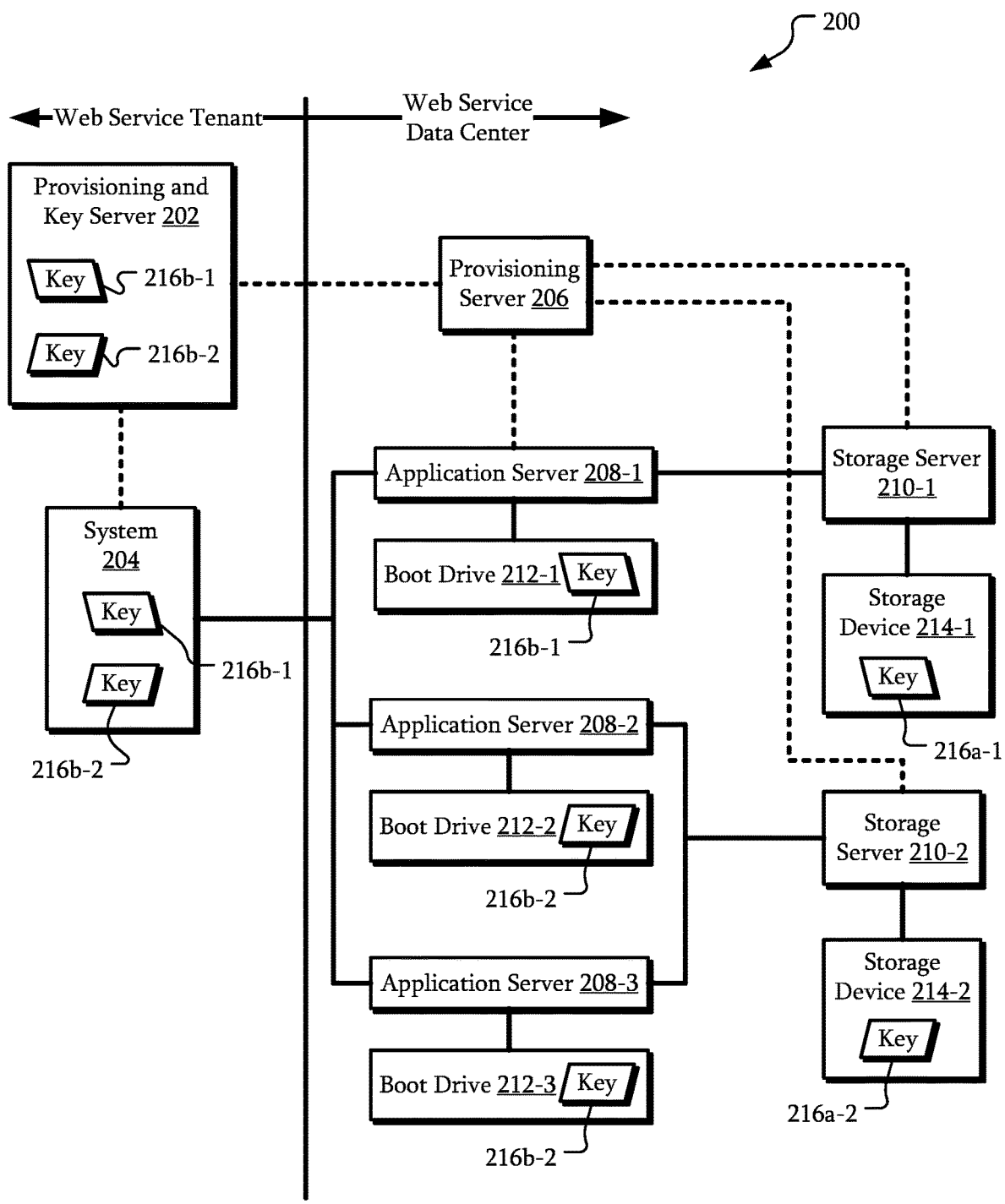

Referring to FIG. 2, in this embodiment, system 200 may be similar to that of system 100 of FIG. 1, including a provisioning server 206, application servers 208, storage servers 210, and storage devices 214 similar to the provisioning server 106, application server 108, a storage server 110, and storage device 114. In addition, keys 216a-1 and 216b-1 are similar to keys 116a and 116b of FIG. 1 and may be similarly stored in the storage device 214-1, boot drive 212-1, and tenant system 204. However, keys 216a-2 and 216b-2 are also similarly stored in the storage device 214-2, boot drives 212-2 and 212-3, and the tenant system 204. Accordingly, the tenant system 204 can also access the storage device 214-2 through the storage server 210-2 and application servers 208-2 and/or 208-3 using the key 216b-2.

Figure 3B:
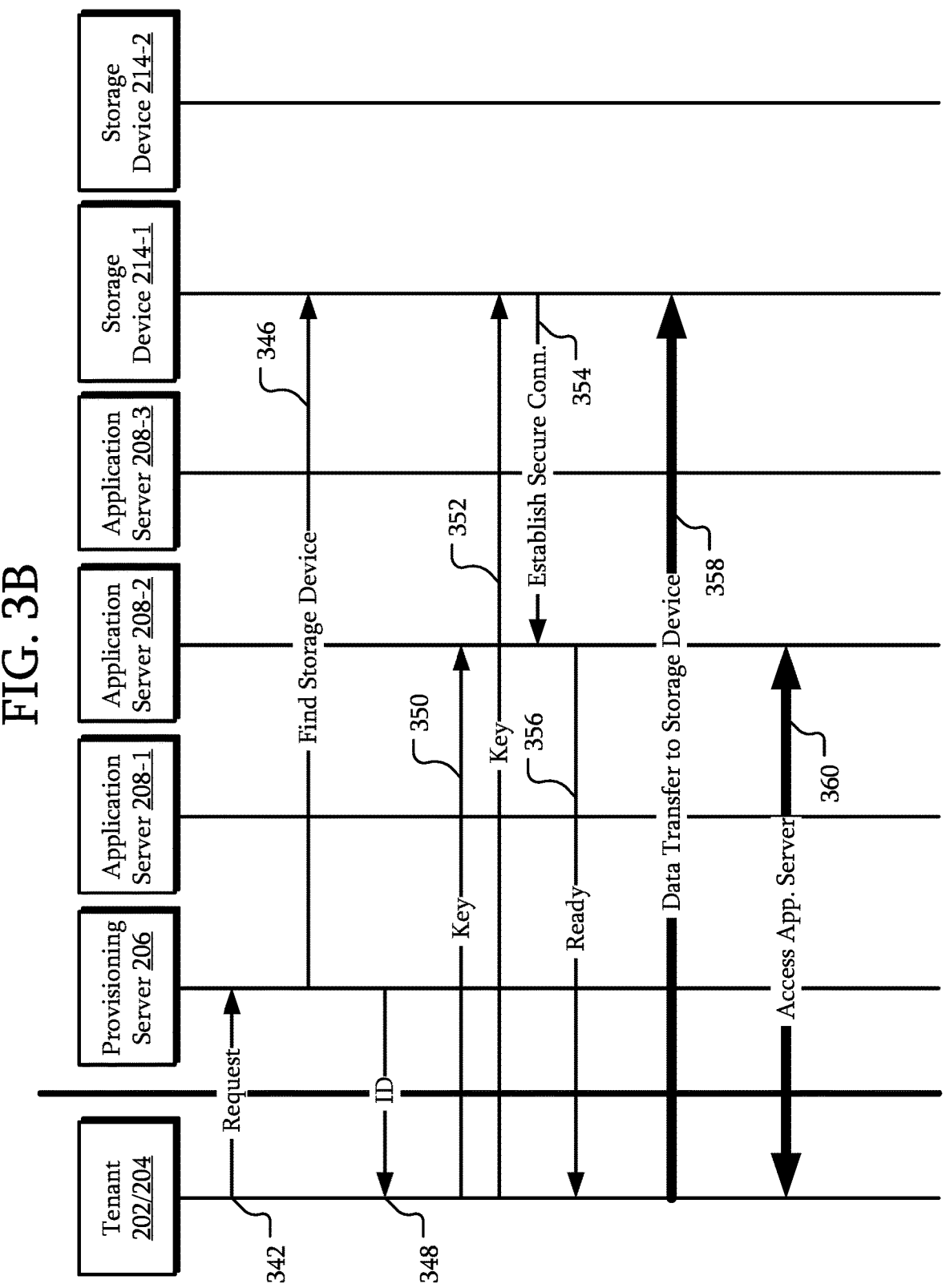

FIGS. 3A and 3B illustrate operations of systems according to some embodiments. Referring to FIG. 3A, the components of FIG. 2 will be used as an example. In 322, a request is transmitted from the tenant provisioning and key server 202 or the tenant system 204. The tenant 202/204 will be used to represent communications that may be transmitted to and from either the tenant provisioning and key server 202 or the tenant system 204 depending on the particular configuration of the tenant. The request is transmitted to the system 200's provisioning server 206.

The provisioning server 206 finds an application server 208 in 324 and a storage device 214 in 326. Here, the provisioning server 206 has found the application server 208-2 and the storage device 214-2. The provisioning server 206 responds in 328 to the tenant 202/204 with identifications of the application server 208-2 and the storage device 214-2.

The tenant 202/204 then generates keys 216a and 216b. For example, in some embodiments, the tenant provisioning and key server 202 will generate and distribute the keys 216a and 216b. However, in other embodiments, the tenant provisioning and key server 202 will transmit the identifications of the application server 208 and the storage device 214 to the tenant system 204. The tenant system 204 will then generate and distribute the keys 216a and 216b. In particular, in 330, the key 216b is transmitted to the application server 208-2 and in 332, the key 216a is transmitted to the storage device 214-2. In some embodiments, regardless of the source, the keys 216a and 216b are transmitted to the destinations securely. In particular, the key 216a is transmitted securely to the storage device 214 such that no system between the tenant transmitter and the storage device itself can intercept the key 116a. For example, the tenant 202/204 may be configured to use Secure Sockets Layer (SSL), Transport Layer Security (TLS), or another cryptographic protocol to establish a secure communication channel with the storage device 214-2 and application server 208-2 through which the keys 216a and 216b are transmitted. As will be described in further detail below, the storage device 214 is configured to restrict access to the key 116a. Thus, the key 116a will be known only to the web service tenant.

In 334, the application server 208-2 and the storage device 214-2 establish a secure connection. In particular, as the application server 208-2 has received the key 216b from the tenant 202/204, the application server 208-2 is capable of accessing the storage device 214-2. In other embodiments, the application server 208-2 and the storage device 214-2 use the keys 216a and 216b to establish a secure communication channel using a cryptographic protocol such as those described above. In 336, the application server 208-2 reports to the tenant 202/204 that the secure resources are available.

In response, in 338, the tenant 202/204 initializes the data stored on the storage device 214-2 by transferring the data securely to the storage device 214-2 using the key 216b. The transfer in 338 may be performed over a secure communication channel established between the tenant system 204 and the storage device 214-2 using the keys 216a and 216b similar to the secure communication channels described above. The tenant system 204 then accesses the application server 208-2 in 340, which has access to the storage device 214-2.

Accordingly, as the keys 216a and 216b were generated by the tenant 202/204, an administrator of the web service data center is unable to access the data stored in the storage device 214-2. In particular, while the administrator may be able to destroy the data, reinitialize the storage device 214-2, or the like, the administrator will be unable to read the unencrypted data. The keys 216a and 216b are not stored in a manner that is accessible by operating systems external to the storage device 214-2.

Referring to FIG. 3B, in some embodiments, the tenant 202/204 requests in 342 to add storage to an existing application server 208-2. The request 342 is sent to the provisioning server 206. The provisioning server 206 finds an available storage device 214 in 346. Here, the available storage device is storage device 214-1. The provisioning server 206 then transmits the identification of the storage device 214-1 to the tenant 202/204 in 348.

The tenant 202/204 then generates new keys 216a-2 and 216b-2. The tenant 202/204 transmits the keys 216a-2 and 216b-2 to the application server 208-2 and the new storage device 214-1 in 350 and 352. In 354 a secure connection is established between the application server 208-2 and the new storage device 214-1. The application server 208-2 then reports to the tenant 202/204 that the storage is ready in 356. Similar to the process described in FIG. 3A, the tenant 202/204 transfers data to the storage device 214-1 in 358 and the tenant system 204 accesses the storage device 214-1 through the application server 208-2 in 360.

Figure 4:
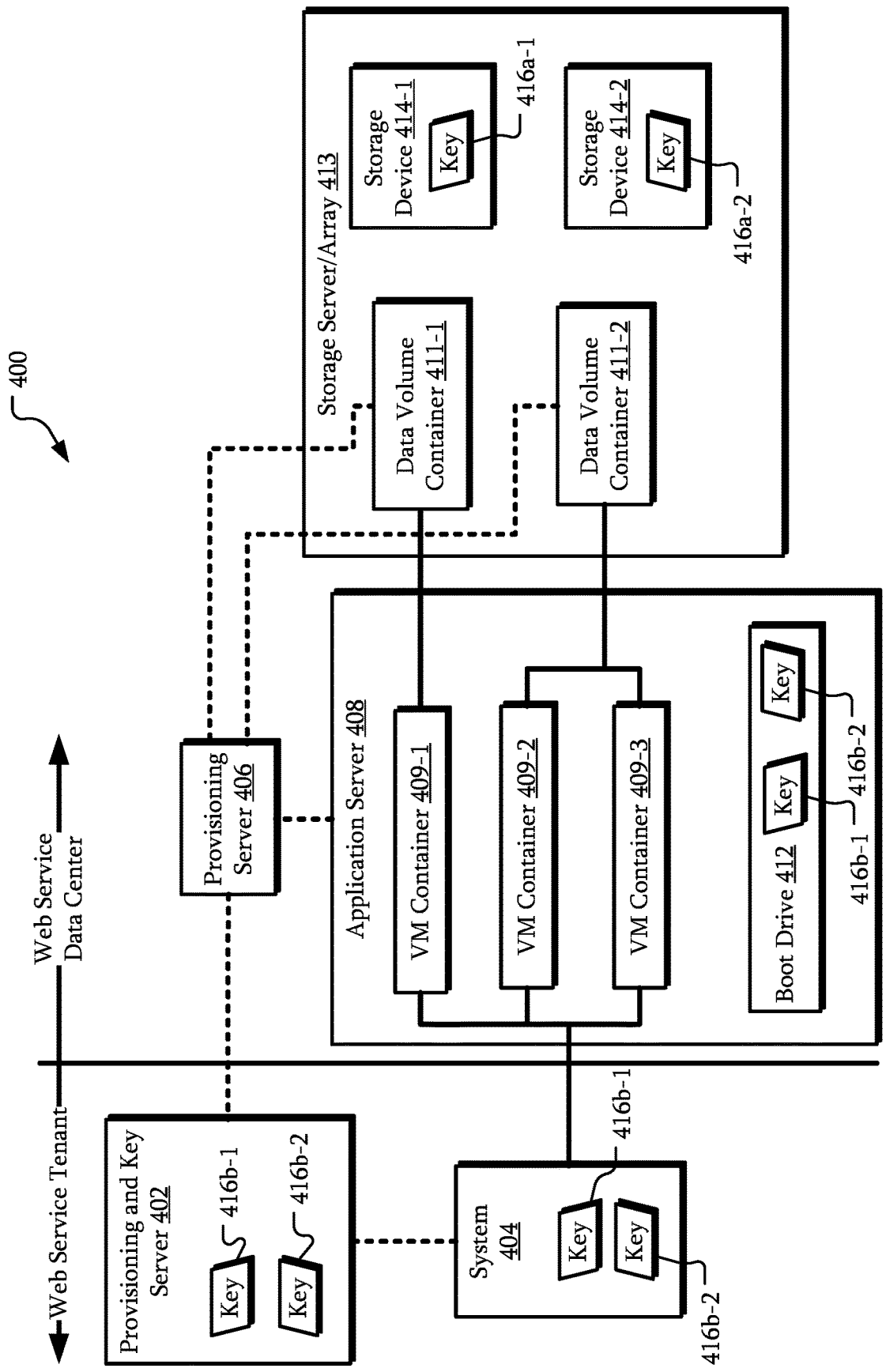
FIGS. 4-5 are schematic views of systems according to various embodiments.
Figure 5:
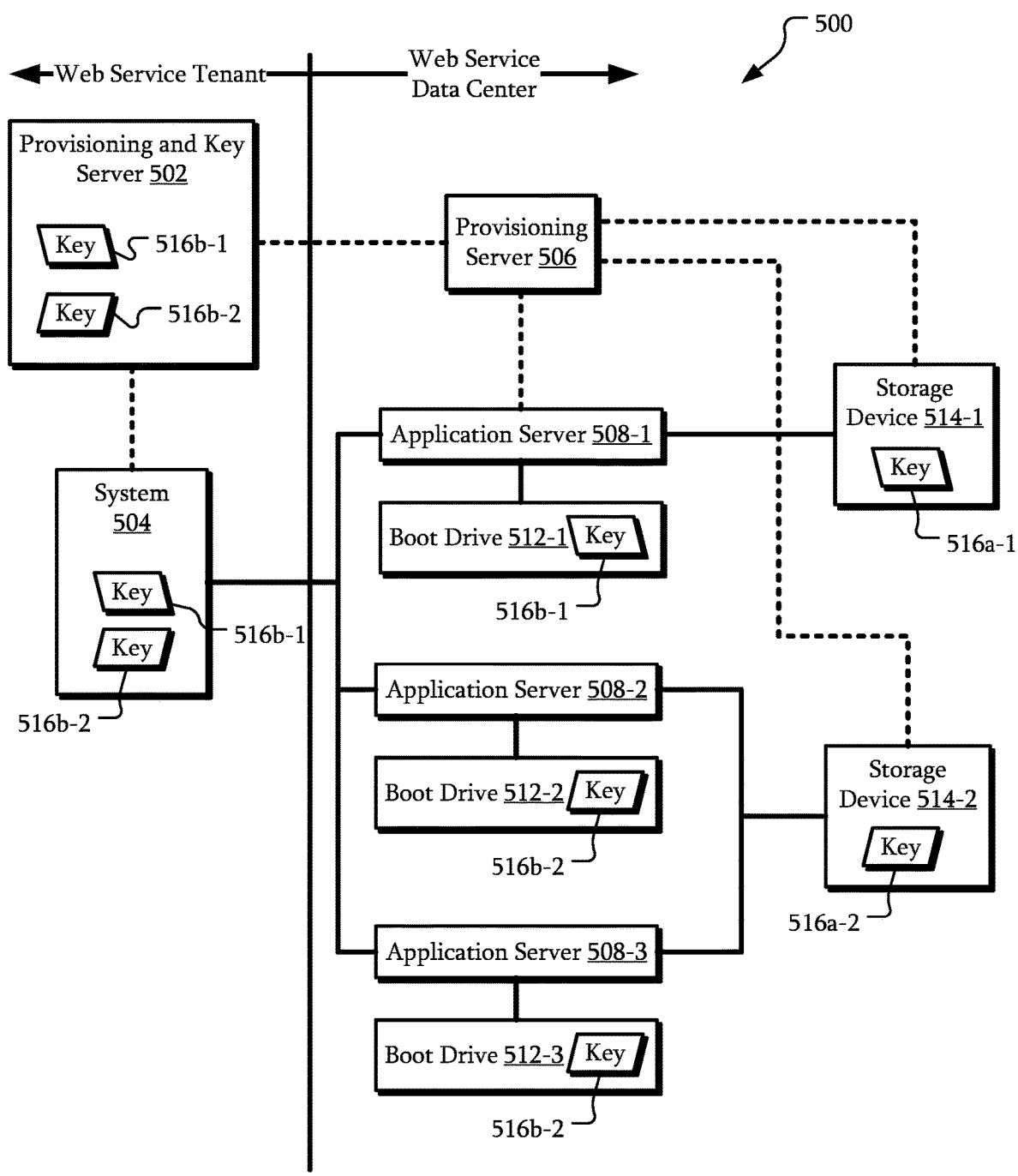

FIGS. 4-5 are schematic views of systems according to various embodiments. Referring to FIG. 4, the system 400 includes components similar to the system 200 of FIG. 2. However, in this includes an application server 408 configured to present multiple virtual machine (VM) containers 409-1 to 409-3. The boot drive 412 of the application server 408 is configured to store the keys 416b-1 and 416b-2.

The storage server/array 413 is a storage server or a storage array. The storage server/array 413 is configured to present multiple data volume containers 411-1 and 411-2. The storage server/array 413 includes the storage devices 414-1 and 414-2, which store keys 416a-1 and 416a-2, respectively. Accordingly, when a tenant client 404 accesses storage of a storage device 414-1 or 414-2, the data may be securely stored using the associated keys even though the data is accessed in a virtualized environment.

Referring to FIG. 5, in this embodiment, the system 500 is similar to the system 200 of FIG. 2 including a provisioning server 506 and application servers 508 with boot drives 512 similar to the provisioning server 206 and application servers 208 with boot drives 212. However, the system 500 includes network-attached storage devices such as network attached storage devices 514-1 and 514-2. In particular, the network attached storage devices 514-1 and 514-2 are coupled to the application servers 508 through network connections. Although direct connections to the application servers 508 are illustrated, in some embodiments, the tenant provisioning and key server 502, tenant system 504, provisioning server 506, application servers 508, and the network attached storage devices 514-1 and 514-2 may be coupled to a network. Thus, such systems and devices may form connections through the network.

While embodiments are applicable to any network-attached storage systems, such as network attached storage servers and storage arrays, embodiments are applicable to network attached storage devices, illustrated here as network attached storage devices 514-1 and 514-2, such as Ethernet attached solid state devices (SSD), NVMe over Fabrics SSDs, Ethernet attached hard disk drives, or the like. In particular, embodiments may be used with network-attached storage devices 514-1 and 514-2 by using processing capabilities and storage of the network-attached storage devices 514-1 and 514-2. The security may be improved without utilizing an operating system of a server of the web service data center as the security related operations are performed by the tenant system 504, the application servers 508 and/or the network-attached storage devices 514-1 and 514-2. As a result there may be reduced or eliminated processing overhead or maintenance. In addition, the security challenges of operating systems may be reduced or eliminated, reducing or eliminating potential attack planes to exploit the stored data.

Although particular connections between application servers, storage servers, storage devices, and the like have been used as examples, in other embodiments, different connections are formed to enable to communications described herein. Moreover, although direct connections between such components have been illustrated as examples, in other embodiments, the connections may be formed through networks or other intermediaries.

Figure 6B:
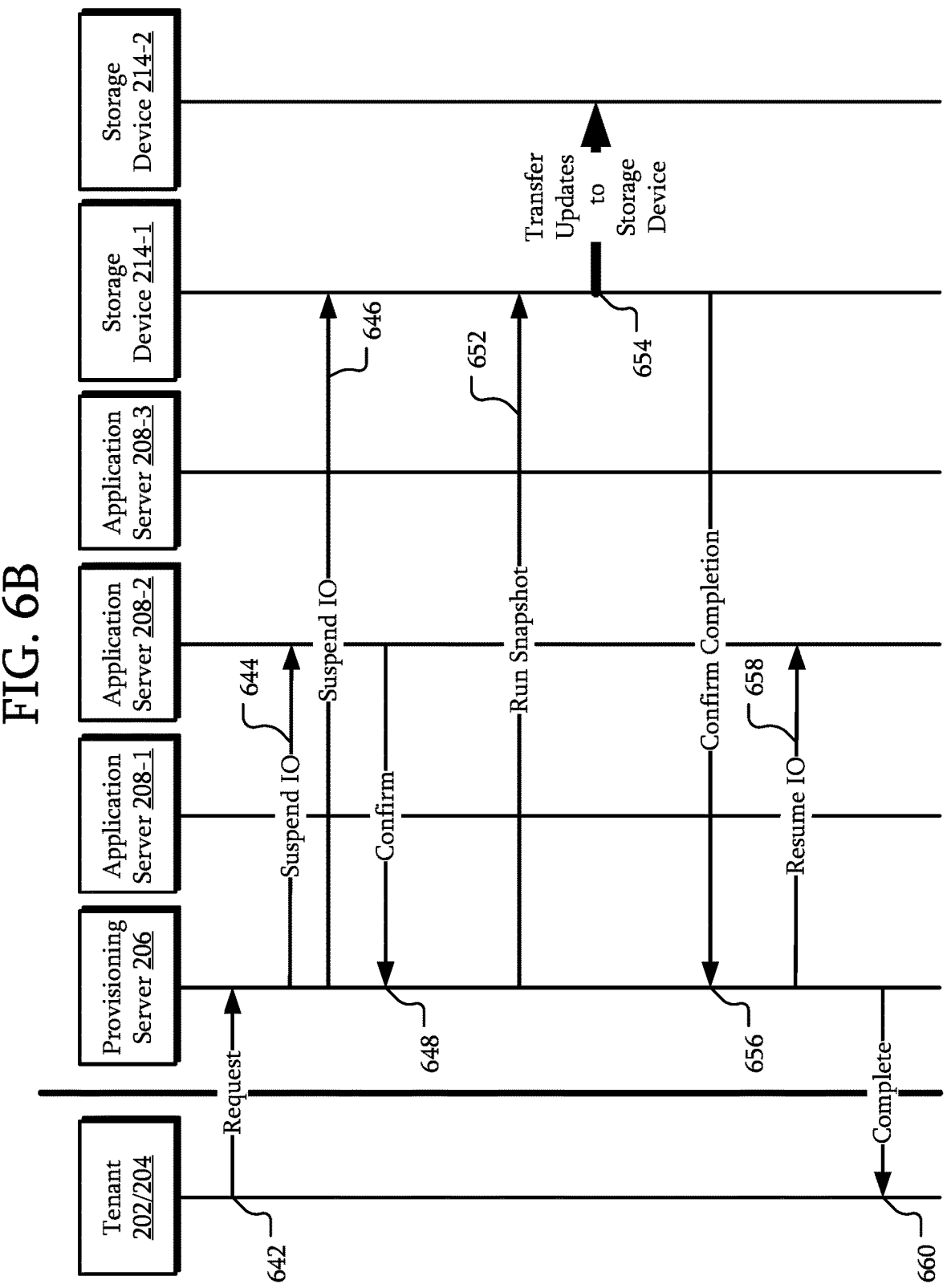

FIGS. 6A and 6B illustrate operations of systems according to some other embodiments. Referring to FIG. 6A, in this embodiment, a snapshot is created. Operations will be described with respect to FIG. 2 as an example. In particular, in 622, a request is made from the tenant 202/204 to the provisioning server 206 to allocate a storage device for a snapshot. The request includes an identification of the existing storage device 214-1 and may include an identification of the existing application server 208-2.

In response to the request, in 624, the provisioning server 206 finds the existing storage device 214-1 in 624 and finds an available storage device 214-2 in 626 to use as the snapshot storage device. The provisioning server 206 transmits the identifications of the snapshot storage device 214-2 to the tenant 202/204 in 628.

The tenant 202/204 generates new keys 216a-2 and 216b-2. In 630, the tenant 202/204 transmits the key 216b-2 to the storage device 214-1. In 632, the tenant 202/204 transmits the key 216a-2 to the storage device 214-2. Accordingly, the storage device 214-1 may access the storage device 214-2 and, in 638, the storage device 214-1 transfers the snapshot of the encrypted data on the storage device 214-1 to the storage device 214-2.

Although transferring directly from storage device 214-1 to storage device 214-2 has been used as an example, the transfer may be accomplished in other ways. For example, the storage servers 210, application servers 208, and/or the tenant system 204 may perform the transfer of the data. Here, such a transfer is illustrated by the dashed line. The key 216b-2 would be transferred to that particular system to enable the system to securely transmit the data to the storage device 214-2.

Once the snapshot is transferred to the storage device 214-2, the storage device 214-2 reports to the provisioning server 206 that the snapshot is ready in 640. The provisioning server 206 reports to the tenant 202/204 that the snapshot is ready in 641.

Referring to FIG. 6B, in some embodiments, a snapshot will be updated. Using system 200 of FIG. 2 and the creation of a snapshot in FIG. 6A as examples, in 642, the tenant 202/204 transmits a request to the provisioning server 206 to update the snapshot. In response, the provisioning server 206 transmits a command to suspend input/output operations to the application server 208-2 in 644 and to the storage device 214-1 in 646. The application server 208-2 confirms that the input/output operations are suspended in 648 to the provisioning server 206. Although the provisioning server 206 has been used as an example of a system that instructs the storage device 214-1 to suspend input/output operations, in other embodiments, the application server 208-2 transmits the suspend command.

In 652, the provisioning server 206 transmits a command to the storage device 214-1 to update the snapshot on storage device 214-2. In response, in 654, the storage device 214-1 transmits the portions of the encrypted data that were updated after the snapshot was created to the snapshot storage device 214-2 that was previously configured. In particular, as described with respect to FIG. 6A, when the snapshot was created, the keys 216a-2 and 216b-2 were previously transmitted to the storage devices 214-1 and 214-2. As a result, the storage devices 214-1 and 214-2 use the existing keys to transfer the data.

In 656, once the transfer is complete, the storage device 214-1 notifies the provisioning server 206 that the transfer is complete. The provisioning server 206 then instructs the application server 208-2 to resume input/output operations in 658. The provisioning server 206 then reports to the tenant 202/204 that the update is complete in 660. The response in 660 may include additional information such as time-stamp information related to the updated snapshot.

Although the system of FIG. 2 was used as an example, the operations described herein may be implemented in differently configured systems. For example, in other embodiments, the operations may be implemented in the systems of FIGS. 1, 4, and 5 or other similar systems.

Figure 7A:
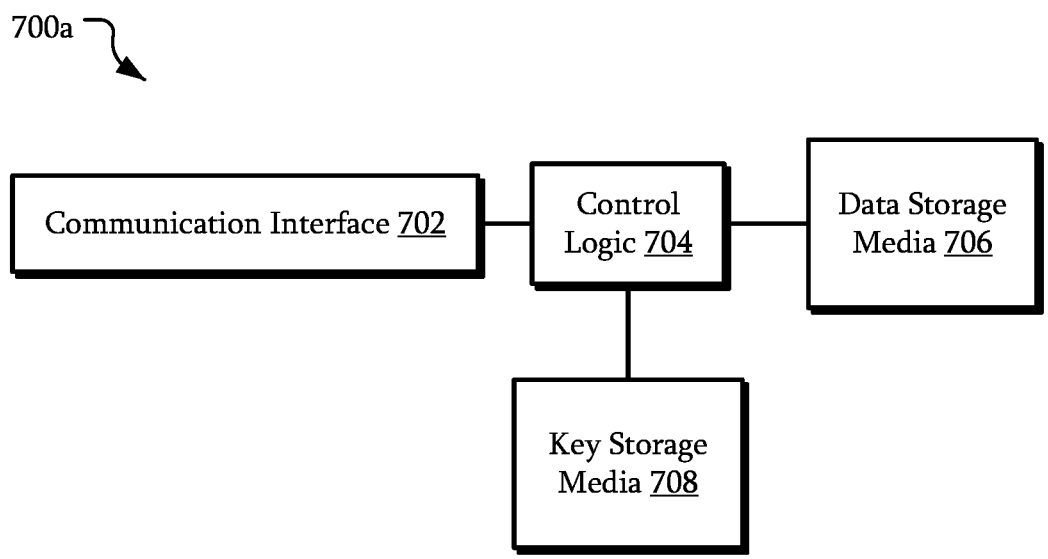
FIGS. 7A and 7B are schematic views of storage devices according to some embodiments.
Figure 7B:
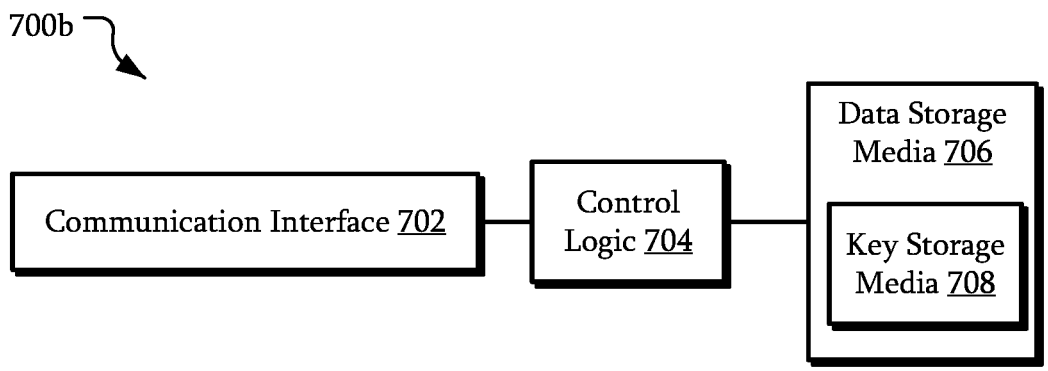

FIGS. 7A and 7B are schematic views of storage devices according to some embodiments. Referring to FIG. 7A, in this embodiment a storage device 700a includes a communication interface 702, control logic 704, data storage media 706, and key storage media 708.

The communication interface 702 is the physical interface and associated circuitry through which the storage device 700a communicates. For example, the communication interface 702 may include interfaces such as a small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), universal flash storage (UFS), Firewire, network interfaces such as Ethernet, Infiniband and Fibre Channel, and/or the like.

The control logic 704 is coupled to the communication interface 702, data storage media 706, and key storage media 708. The control logic 704 is circuitry that controls operation of the storage device 700a. In some embodiments, the control logic 704 includes a general purpose processor, a digital signal processor (DSP), an application specific integrated circuit, a microcontroller, a programmable logic device, discrete circuits, a combination of such devices, or the like. The control logic 704 may include internal portions, such as registers, cache memory, processing cores, or the like, and may also include external and internal interfaces, such as address and data bus interfaces, interrupt interfaces, or the like. Although only one control logic 704 is illustrated in the storage device 700a, multiple control logics 704 may be present and operate to implement various functions of the storage device 700a independently or in cooperation with each other. In addition, other interface devices, such as logic chipsets, hubs, memory controllers, communication interfaces, or the like may be part of the storage device 700a to connect the control logic 704 to internal and external components. In addition, additional components such as memory, busses, or the like may also be part of the storage device 700a.

The data storage media 706 is the main storage media for the storage device 700a. In some embodiments the data storage media 706 includes at least one nonvolatile memory, such as a flash memory, a phase change random access memory (PRAM), a resistance random access memory (RRAM), a magnetic random access memory (MRAM), a ferroelectric random access memory (FRAM), a nanofloating gate memory (NFGM), or a polymer random access memory (PoRAM), combinations of such memories or similar memories, or the like. However, in other embodiments, the storage media includes other types of storage media, such as magnetic media, optical media, or the like.

The control logic 704 is configured to enable access to the data storage media 706 through the storage interface 702. For example, the control logic 704 is configured to perform storage related operations such as accessing and/or managing the non-volatile storage media 706, reading and writing data, or the like.

In this embodiment, the key storage media 708 is the memory in which keys described above are stored. Here, the key storage media 708 is separate from the data storage media 706. In some embodiments, the key storage media 708 is the same type of memory as the data storage media 706; however, in other embodiments the key storage media 708 is a different type such as those described above for the data storage media 706.

The control logic 704 is configured to restrict access to data stored in the data storage media 706 using at least one of the first key and the second key. For example, in some embodiments, the control logic 704 is configured to store data encrypted with the second key received through the communication interface in the data storage media 706. Accordingly, the data stored in the data storage media 706 is inaccessible to root accesses that do not have the first key available. When a read request is received, the control logic 704 is configured to read the stored data from the data storage media 706 using the first key. Although the data is now decrypted relative to the data stored in the data storage media 706, the data may be securely transmitted through the communication interface 702 through a secure communication channel. Thus, the security of the data may be maintained as it is read from the storage device 700a.

In other embodiments, the control logic 704 is configured to receive the second key through the communication interface 702. The control logic 704 is configured to authenticate an access to the data storage media 706 based on the first key and the second key. In one example, the control logic 704 determines if the first key matches the second key; however, other authentication techniques may be used. If the access is authenticated, the control logic 704 is configured to permit access to the data storage media 706. However, if the access is not authenticated, the control logic 704 is configured to prevent access to the data storage media 706. Accordingly, even if the data on the data storage device 706 is not encrypted, external access is prevented. As a result, even if an administrator has root level privileges on a server including the data storage device 700a, the administrator is not able to access the clear data in the data storage media 706 without authorization as the control logic 704 prevents the unauthorized access.

As described above, the storage device 700a may receive a key for various functions. The control logic 704 is configured to store these keys in the key storage media 708. For example, a key may be received during manufacturing, during configuration by a tenant, when establishing a snapshot, or the like and stored in the key storage media 708.

Referring to FIG. 7B, in this embodiment, the storage device 700b is similar to the storage device 700a of FIG. 7A. However, the key storage media 708 is part of the data storage media 706. In some embodiments, the control logic 704 is configured to segregate a portion of the data storage media 706 for use as the key storage media 708.

In some embodiments, regardless of whether the key storage media 708 is separate from or part of the data storage media 706, the control logic 704 is configured to restrict access to the key storage media 708. For example, the control logic 704 may completely prevent external accesses to the key storage media 708.

In some embodiments the control logic 704 is configured to permit some access to the data storage media 706 and the key storage media 708 that is otherwise unauthorized. For example, the control logic 704 may permit the data storage media 706 and/or the key storage media 708 to be erased, re-provisioned in association with new keys, or the like in a manner that permits reuse of the data storage device, but does not allow reading of the stored data.

In some embodiments, the control logic 704 is further configured to permit only write access for accesses to the key storage media 708 initiated external to the storage device 700a/700b. For example, during the operations described with respect to FIG. 3A, when the key is transmitted in 332, the key may be received by the control logic 704 through the communication interface 702. As the control logic 704 is currently configuring new storage, the control logic 704 may permit the key to be written to the key storage media 708. The control logic 704 may be configured to prevent read accesses from an external source to the key storage media 708. The control logic 704 itself may be configured to read the key from the key storage media 708, for example, to determine whether an access is authorized; however, in this example, the control logic 704, which is internal to the storage device 700a/700b, is initiating the access. Accordingly, the key may be overwritten in a subsequent reconfiguration; however, as the key cannot be read by an external source, a chance of unauthorized access is reduced or eliminated. Thus, an access to read the key by an operating system of a server of a web service data center is prevented and, consequently, access the associated data is prevented.

Although the structures, devices, methods, and systems have been described in accordance with particular embodiments, one of ordinary skill in the art will readily recognize that many variations to the disclosed embodiments are possible, and any variations should therefore be considered to be within the spirit and scope of the structures, devices, and systems disclosed herein. Accordingly, many modifications may be made by one of ordinary skill in the art without departing from the spirit and scope of the appended claims.

The invention claimed is:

1. A system, comprising:
    a storage device configured to receive a first key associated with a second key from a tenant system and store the first key in key storage media of the storage device, the first key and the second key being created at the tenant system, and the key storage media being secure from root-level access;
    a storage server configured to present the tenant system a web service provided by the storage device; and
    an application server configured to provide the web service, presented by the storage server and the storage device, to the tenant system, the application server being further configured to receive the second key from the tenant system and access the storage device using the second key;
    wherein the storage device is further configured to restrict access including root-level access to data stored on the storage device using at least one of the first key and the second key.

2. The system of claim 1, further comprising a provisioning server configured to transmit an identification of the storage device and the application server to the tenant system.

3. The system of claim 1, wherein the storage device is configured establish a secure connection to the application server after receiving the first key from the tenant system.

4. The system of claim 3, wherein the application server is configured to notify the tenant system that secure resources are available.

5. The system of claim 4, wherein the storage device is further configured to receive initial data from the tenant system.

6. The system of claim 1, further comprising a provisioning server configured to:
    receive a command to create a snapshot;
    identify an available storage device as a snapshot storage device; and
    transmit an identification of the snapshot storage device to the tenant system.

7. The system of claim 6, wherein:
    the storage device is further configured to receive a third key associated with a fourth key from the tenant system;
    the snapshot storage device is configured to receive the fourth key from the tenant system; and
    the storage device is further configured to transmit a snapshot of encrypted data to the snapshot storage device using the third key.

8. The system of claim 7, wherein the storage device is further configured to:
    receive a command to update the snapshot; and
    transmit portions of the encrypted data updated after the snapshot was created to the snapshot storage device using the third key.

9. The system of claim 1, wherein the first key and the second key comprise asymmetric public and private keys.

10. The system of claim 9, wherein the first key comprises a public key and the second key comprises a private key.

11. The system of claim 1, wherein the first key comprises a public key of an asymmetric key pair, and the second key comprises a private key of the asymmetric key pair.

12. The system of claim 1, where the first key and the second key comprise symmetric keys.

* * * * *